Figure 1:
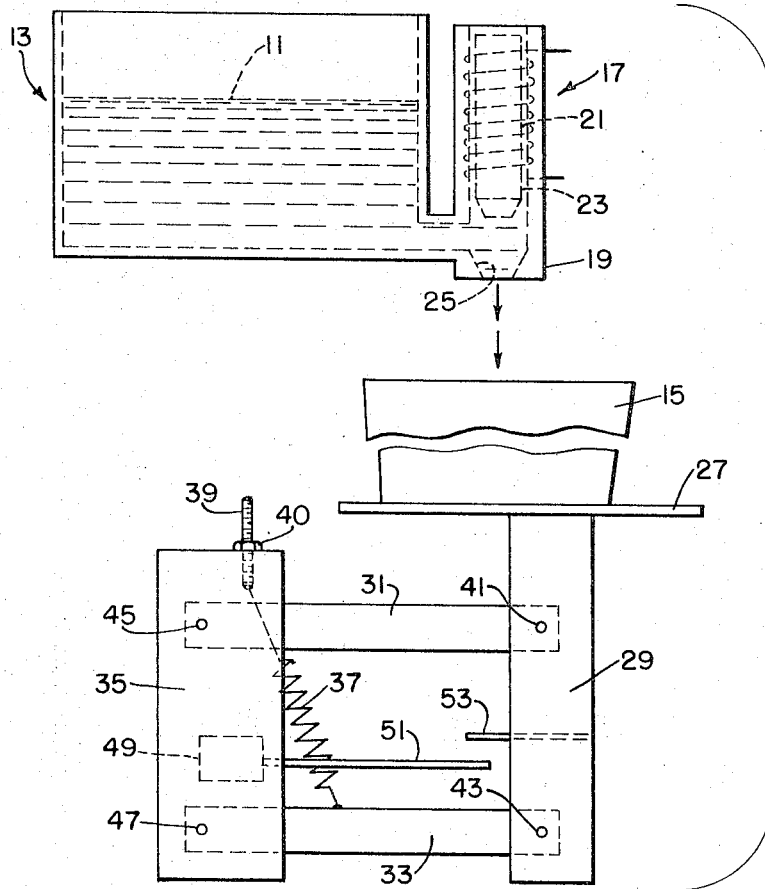

Aug. 15, 1967  H. T. TYTUS  3,335,807
FLUID WEIGHT CONTROL METER
Filed March 29, 1966

INVENTOR
HULBERT T. TYTUS
BY
ATTORNEYS

| United States Patent Office | 3,335,807 |
|---|---|
| | Patented Aug. 15, 1967 |

3,335,807
FLUID WEIGHT CONTROL METER
Hulbert T. Tytus, 1152 Commonwealth Ave.,
Boston, Mass. 02165
Filed Mar. 29, 1966, Ser. No. 538,380
2 Claims. (Cl. 177—79)

This invention relates in general to control meters and more particularly, devices for controlling the weight of fluid dispensed from a fluid reservoir into a fluid receiving container.

The advantages to the food and drink industry of an automatic control unit for dispensing predetermined weights of fluid from a fluid reservoir into a fluid receiving container are obvious inasmuch as the cost of such fluids are generally a function of their weight rather than their volume. With a nonautomatic weighing device, waitresses, cooks and the like generally remain otherwise idle in order to closely observe the filling process, determine the instant when almost the predetermined weight of fluid has been transferred, and then stop the fluid flow, hopefully just in time to permit the residue of the fluid leaking from the outlet valve to make up the weight difference. Commercial automatic control units presently in use have not, however, proven completely satisfactory. Existing control units, such as those based on timers which permit fluid flow for only a predetermined period, are satisfactory for fluids such as carbonated drinks, light fruit juices and the like, which exhibit only minor density or viscosity changes in response to moderate variations in their temperature.

On the other hand, such other fluids as custards and prepared milk shake mixes may undergo such wide variations in both density and viscosity in response to modest temperature changes that two containers receiving fluid flows of the same time duration, but at temperatures varying by 15° F., may contain fluid weights varying by up to twenty percent. These weight variations are especially noticeable just after a new batch of material has been introduced into the fluid reservoir, when the dispensing machine has just been started after a shut-down period and at other times when the overall internal temperature of the material in the fluid reservoir may normally be expected to differ from the norm for the reservoir or when local hot or cold spots within the material are likely to occur. The typical occurrence of these temperature variations in commercial fluid dispensing machines obviously render the automatic control units based on timers unsatisfactory.

A further disadvantage of the existing "timer" control units is that they are operable only in terms of whole cycles; for example, a device based on a ten second timer will deliver a ten second fluid flow or a twenty second fluid flow if put through a second cycle. If, however, the operator desires to deliver a fifteen second fluid flow into the container, he must start a second cycle after completion of the first and remove the container mid-way through the second cycle, thereby wasting the remaining five second fluid flow.

Accordingly, it is an object and purpose of the present invention to provide an automatic unit, for control of the weight of fluid entering a container from a fluid reservoir, which is not rendered ineffectual by variations in the density or viscosity of the fluid.

A further object is the provision of a control unit which is capable of delivering not only a predetermined weight of fluid, but also additional weights of fluid as desired by the operator without incurring fluid waste.

Figure 2:
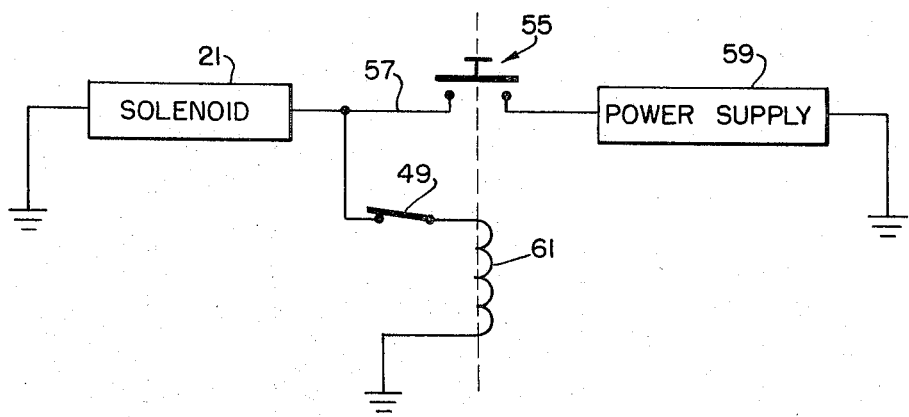

Further objects and purposes of the present invention will become apparent upon a perusal of the description below in conjunction with the accompanying drawing wherein:

FIG. 1 is an elevational view of one embodiment, and
FIG. 2 is a schematic representation of the circuitry for the embodiment of FIG. 1.

With reference to the drawing, and more particularly FIG. 1 thereof, the flow of fluid 11 from the fluid reservoir 13 into the container 15, is controlled by an electrically operated dispensing valve 17. The normally closed dispensing valve 17 is comprised of an outlet pipe 19 communicating with the fluid 11 within the reservoir 13 and a solenoid 21 having a core 23 normally resting in and blocking a restricted interior circumference 25 of the outlet pipe 19. Upon actuation, the solenoid 21 electromagnetically elevates the core 23 and maintains it in an elevated condition to permit passage of the fluid 11 through the outlet pipe 19 and into the container 15 located thereunder.

The container 15 is removably supported on a substantially horizontal platform 27 affixed at a right angle to a platform support 29. A parallel pair of long rectangular crossbars 31, 33 are piovtally attached at one end to the platform support 29 and at the other end to a stationary member 35 having a vertical extension, such as a housing plate.

The platform support 27 is spring-loaded upwardly, either directly or indirectly. As shown in FIG. 1, the platform support 27 is indirectly spring-loaded upwardly by means of a spring 37 affixed at its lower end to the lower crossbar 33 and at its upper end to a screw 39, which screw is in turn affixed to a portion of the housing, such as the stationary member 35, by a rotatable nut 40. Rotation of the nut 40 in one direction raises the screw 39 and attached end of the spring 37 relative to the stationary member 35, thereby extending the spring 37 to increase the upward pressure being exerted on the lower crossbar 33 and elevating the initial or preflow position of the platform support 29. The weight of fluid 11 in the container 15 required to cause closure of the dispensing valve 17 will be a function of this initial position of the platform support 29 and may therefore be easily varied by rotation of the nut 40. The spring 39 is preferably adjusted to possess sufficient tension to maintain the crossbars 31, 33 substantially horizontal until fluid flow has commenced. Alternatively, as noted above, the platform support 29 may be directly spring-loaded upwardly, for instance, by means of a spring fixed at opposite ends to the bottom of the platform support and a portion of the housing thereunder.

The plane of the pivotal connections 41, 43 common to the crossbars 31, 33 and the platform support 29 and the plane of the pivotal connections 45, 47 common to the crossbars 31, 33 and the stationary member 35 are parallel; accordingly, while movement of the platform support 29 will have vertical and horizontal components, the orientation of the longitudinal axis of the platform support 29 will remain vertical. The length of the crossbar 31, 33 will determine the ratio of the horizontal components of the platform support movement to the vertical components, longer crossbars 31, 33 resulting in a desirably lower ratio.

A normally closed weight limit switch 49 affixed to a segment of the stationary member 35 between the crossbars 31, 33 opens when its long control bar 51, extending horizontally towards the platform support 29, undergoes a predetermined degree of angular rotation. A relatively short projection 53 on the platform support 29 extends horizontally between the crossbars 31, 33 towards the stationary member 35. The control bar 51 and the projection 53 are constructed and arranged so that, during filling of the container 15, the tip of the descending projection 53 engages and draws the tip of the control bar 51 downward with it, thereby causing an angular rotation of the control bar 51 relative to a point within the weight limit switch 49.

Referring now especially to FIG. 2, to cause fluid flow after placement of the container 15 on the platform 27 under the outlet pipe 19 of the dispensing valve 17, the operator closes a conveniently located, normally open starting switch, such as push button 55, thereby completing the circuit between common lead 57 and grounded power supply 59.

The "hot" common lead 57 actuates the grounded solenoid 21 of the dispensing valve 17, which in turn raises the core 23 to clear the outlet pipe 19 and permit fluid 11 to flow from the reservoir 13 into the container 15 resting on the platform 27. The "hot" common lead 57 also actuates a grounded relay coil 61, through the normally closed weight limit switch 49, which relay coil 61 in turn electromagnetically maintains the start button 55 in its "on" position or "actuating" position.

The continued flow of fluid 11 into the container 15 increases the effective weight acting against the upward pressure of the spring 37, and cause the container 15, platform 27, and platform support 29 to move downward. The platform support 29 remains vertical during its descent, undergoing only a slight horizontal movement in the direction of the stationary member 35 as the crossbars 31, 33 assume a more acute diagonal orientation. The continued descent of the platform support 29 causes its projection 53 to eventually engage the control bar 51 of the weight limit switch 49, which control bar 51 is then drawn downward and angularly rotated. By the time the weight of fluid 11 in the container 15 has approached the predetermined weight desired (minus a small weight designed to allow for time delays before closure of the dispensing valve and drippage from the outlet pipe after such closure), the support platform projection 53 has moved through a predetermined vertical displacement sufficient to cause a proportional angular rotation of the control bar 51 sufficient to open the weight limit switch 49. The opening of this switch 49 breaks the connection between the common lead 57 and the relay coil 61. The start button 55, no longer held in its "on" position by the relay coil 61, returns to its normally "off" or "de-actuating" position, thereby in turn deactivating the common lead 57.

No longer energized by the common lead 57, the solenoid 21 permits the solenoid core 23 to drop into the restricted circumference 25 of the outlet pipe 19, thereby closing the dispensing valve 17 to interrupt the flow of fluid 11 into the container 15 from the fluid reservoir 13. Upon removal of the filled container 15, the weight limit switch 49 returns to its normally closed position so that, when the normally open start button 55 is next pressed, the hot common lead 57 again activates the relay 61 through a closed weight limit switch 49.

If, however, the operator wishes to further fill the container 15 in a given instance, he has only to leave the container 15 on the platform 27 and press the start button 55 until the desired fill has been achieved. The hot common lead 57 will actuate the solenoid 21 to permit further flow of fluid 11, but will not actuate the relay coil 61 due to the open weight limit switch. Accordingly, when the start button 55 is released, it returns to its normally off position, thereby de-activating the solenoid 21 to terminate the fluid flow.

The preferred embodiment of the present invention having been described, other embodiments will readily become apparent to those skilled in the art. Accordingly, the scope of the present invention is intended to be limited only by the spirit and scope of the following claims.

What is claimed is:

1. A device for controlling the weight of fluid dispensed from a fluid reservoir through an electrically controlled dispensing valve having a normally closed position comprising:

a substantially horizontal platform suitable for support of a container in position to receive said fluid from said dispensing valve;

first and second rigid members, said first member being stationary, and said second member being horizontally displaced from said first member and affixed to said platform for movement therewith;

a parallel pair of vertically displaced rigid crossbars, extending between said first and second members and pivotally connected thereto, for maintaining said second member vertical while permitting movement thereof with said platform;

start means, having a normally deactuated position, manually operable to an actuating position to electrically open said dispensing valve, to maintain open said dispensing valve only while said start means is in an actuating position;

a weight limit switch, affixed to said first member, having a control arm extending towards said second member for engagement thereby and subsequent downward displacement therewith to mechanically actuate said switch after a predetermined angular rotation of said control arm;

a relay coil, electrically actuated by the start means through said switch, for electromagnetically maintaining said start means in the actuating position while said switch is deactuated;

adjustable spring means urging said platform upwards, including means for adjusting the tension of said spring means to thereby control the weight of fluid dispensed before actuation of said switch;

whereby the manual actuation of said start means opens said dispensing valve to permit the flow of fluid from said reservoir through said dispensing valve into said container and also actuates said relay coil which in turn maintains said start means in the actuating position, said fluid flow causing a progressive downward displacement of said container, platform and second member against the upward urging of said adjustable spring means until said second member engages and causes a predetermined angular rotation of said switch control arm to actuate said switch and thereby deactuate said relay coil, which deactuation in turn permits the return of said start means to a deactuated position and thereby closure of said dispensing valve to terminate said flow and whereby additional flow may be caused by and only during further manual actuation of said start means.

2. Apparatus for controlling the dispensation of fluid from a fluid reservoir through a normally closed dispensing valve into a fluid receiver comprising:

normally deactuated start means, manually actuable, for opening said dispensing valve when actuated and thereby initiating fluid flow;

normally deactuated holding means, actuated by momentary actuation of said start means, for maintaining said dispensing valve open when actuated and thereby continuing fluid flow;

normally closed weight limit switch means, continuously open when the weight of said fluid receiver and its contents exceeds a predetermined value, for deactuating said holding means when open and thereby, only when said start means is deactuated, permitting said dispensing valve to close and terminate fluid flow;

whereby said apparatus is characterized by at least two possible modes of operation: an initial automatic mode initiated by momentary manual actuation of said start means, when said switch means is closed, to cause the dispensation of a predetermined weight of fluid; and a terminal manual mode initiated by and continued only during continued manual actuation of said start means, when said switch means is open, to cause the dispensation of a manually controllable additional quantity of fluid.

References Cited

UNITED STATES PATENTS

| | | | |
|---|---|---|---|
| 289,156 | 11/1883 | Smith | 222—409 X |
| 612,968 | 10/1898 | Hansen | 177—169 |
| 2,727,670 | 12/1955 | Shore | 222—64 X |
| 2,757,846 | 8/1956 | Varrin | 141—359 |
| 3,064,697 | 11/1962 | Mainone | 141—83 |
| 3,087,518 | 4/1963 | Scholle | 141—83 |
| 3,179,035 | 4/1965 | Lockett | 222—64 X |

ROBERT B. REEVES, *Primary Examiner.*

N. L. STACK, *Assistant Examiner.*